US008711686B2

(12) United States Patent
Takagi et al.

(10) Patent No.: US 8,711,686 B2
(45) Date of Patent: Apr. 29, 2014

(54) PACKET TRANSMISSION SYSTEM AND FAULT RECOVERY METHOD

(75) Inventors: Kazuo Takagi, Tokyo (JP); Zhenlong Cui, Tokyo (JP); Masaki Umayabashi, Tokyo (JP); Akira Sakurai, Tokyo (JP)

(73) Assignee: NEC Corporation, Tokyo (JP)

( * ) Notice: Subject to any disclaimer, the term of this patent is extended or adjusted under 35 U.S.C. 154(b) by 30 days.

(21) Appl. No.: 13/219,804

(22) Filed: Aug. 29, 2011

(65) Prior Publication Data

US 2012/0051214 A1    Mar. 1, 2012

(30) Foreign Application Priority Data

Aug. 30, 2010   (JP) .................................. 2010-192255

(51) Int. Cl.
*H04L 12/26* (2006.01)
*H04L 12/56* (2006.01)
*H04L 1/22* (2006.01)
*H04J 14/02* (2006.01)

(52) U.S. Cl.
CPC ................ *H04L 45/28* (2013.01); *H04L 45/22* (2013.01); *H04L 1/22* (2013.01); *H04J 14/0294* (2013.01); *H04J 14/0295* (2013.01)
USPC .............................. 370/228; 370/218; 370/222

(58) Field of Classification Search
None
See application file for complete search history.

(56) References Cited

U.S. PATENT DOCUMENTS

| | | | |
|---|---|---|---|
| 6,721,502 B1 * | 4/2004 | Al-Salameh et al. ............. 398/3 |
| 6,738,345 B1 * | 5/2004 | Williamson ................... 370/217 |
| 6,868,083 B2 * | 3/2005 | Apostolopoulos et al. ... 370/392 |
| 7,130,263 B1 * | 10/2006 | Ong et al. ..................... 370/223 |
| 7,142,504 B1 * | 11/2006 | Uzun ............................. 370/224 |
| 7,372,806 B2 * | 5/2008 | Suemura ....................... 370/223 |
| 2008/0239969 A1 * | 10/2008 | He et al. ..................... 370/241.1 |
| 2012/0281978 A1 * | 11/2012 | Zou ................................... 398/5 |

FOREIGN PATENT DOCUMENTS

JP    2010-147801 A    7/2010

OTHER PUBLICATIONS

International Telecommunication Union, Telecommunication Standardization Section, Ethernet Protection Switching, G.8031/Y.1342 (Jun. 2006).*

(Continued)

*Primary Examiner* — Ian N Moore
*Assistant Examiner* — Eric P Smith
(74) *Attorney, Agent, or Firm* — Sughrue Mion, PLLC

(57) ABSTRACT

Between a first pair of termination nodes, a first current-use packet transmission path and at least one first spare packet transmission path are defined. Between a second pair of termination nodes, a second current-use packet transmission path and at least one second spare packet transmission path are defined. When no network fault occurs, packets are transmitted between the pairs of nodes in a 1:1 transfer mode in which the pairs transfer packets via both current-use packet transmission paths only. When a network fault occurs in the first current-use packet transmission path, both transmissions are switched from a 1:1 transfer mode to a 1+1 transfer mode, in which the first pair of nodes transfer packets by using the first current-use packet transmission path and the first spare packet transmission path, and the second pair transfer packets by using the second current-use packet transmission path and the second spare packet transmission path.

19 Claims, 11 Drawing Sheets

(56) References Cited

OTHER PUBLICATIONS

ITU-T G.8032/Y.1344, "Series G: Transmission Systems and Media, Digital Systems and Networks, Packet over Transport aspects—Ethernet over Transport aspects, Series Y: Global Information Infrastructure, Internet Protocol Aspects and Next-Generation Networks, Internet protocol aspects—Transport", Ethernet ring protection switching, Mar. 2010, International Telecommunication Union, Cited in the Applicant's Specification.

Teruko Fujii et al., "Proposal and Implementation of Multi-class Protection for All Optical Networks", Technical Report of IEICE, The Institute of Electronics, Information and Communication Engineers, NS2003-205, PN2003-33, Dec. 2003, pp. 47-52, with English Abstract. Cited in JP Office Action.

Shinya Kano et al., "Fast Fault Recovery Method for Optical Network using GMPLS Architecture", Technical Report of IEICE, The Institute of Electronics, Information and Communication Engineers, CS2003-4, OCS2003-11, May 2003, pp. 19-24, with English Abstract. Cited in JP Office Action.

Japanese Office Action for JP Application No. 2010-192255 mailed on Jan. 17, 2014 with Partial English Translation.

* cited by examiner

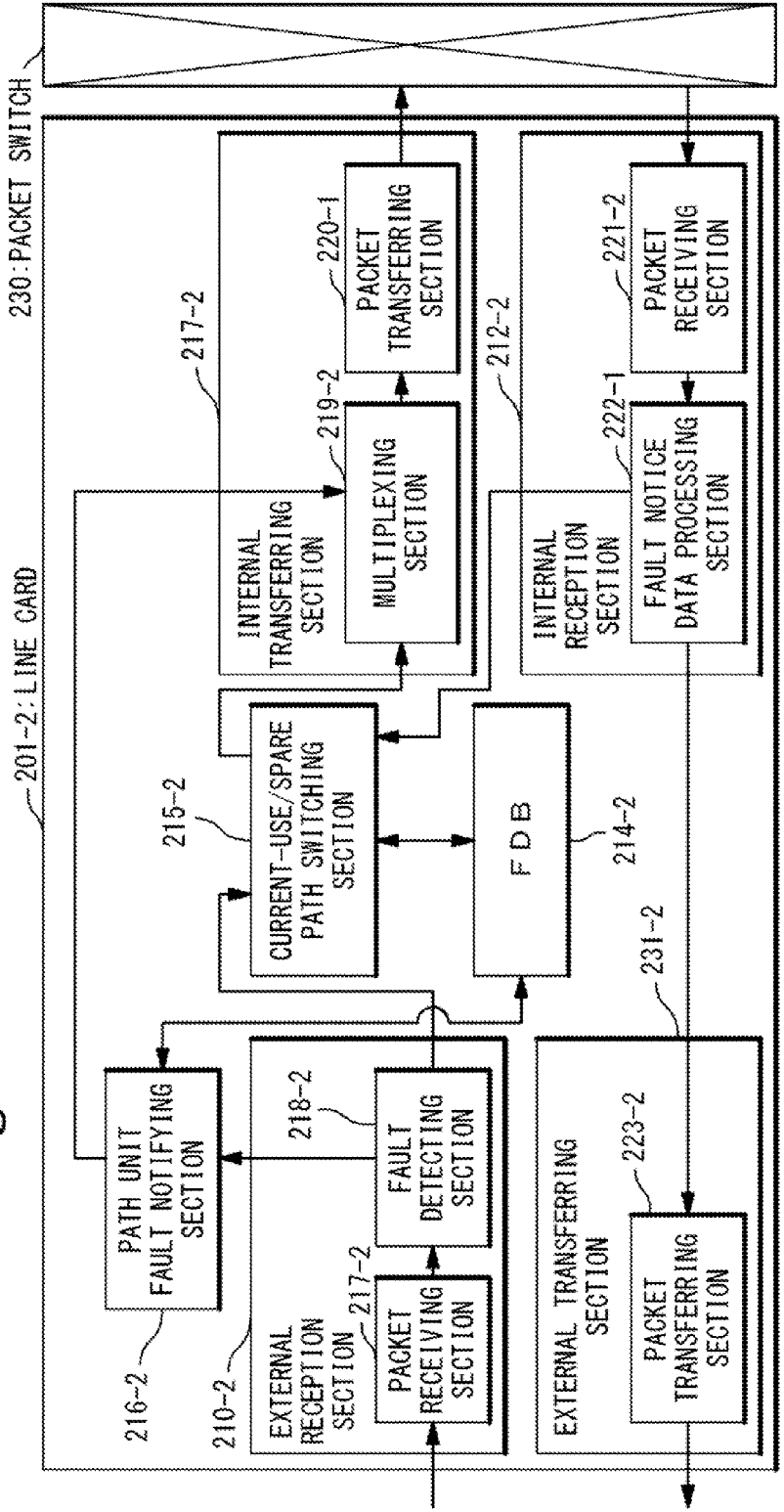

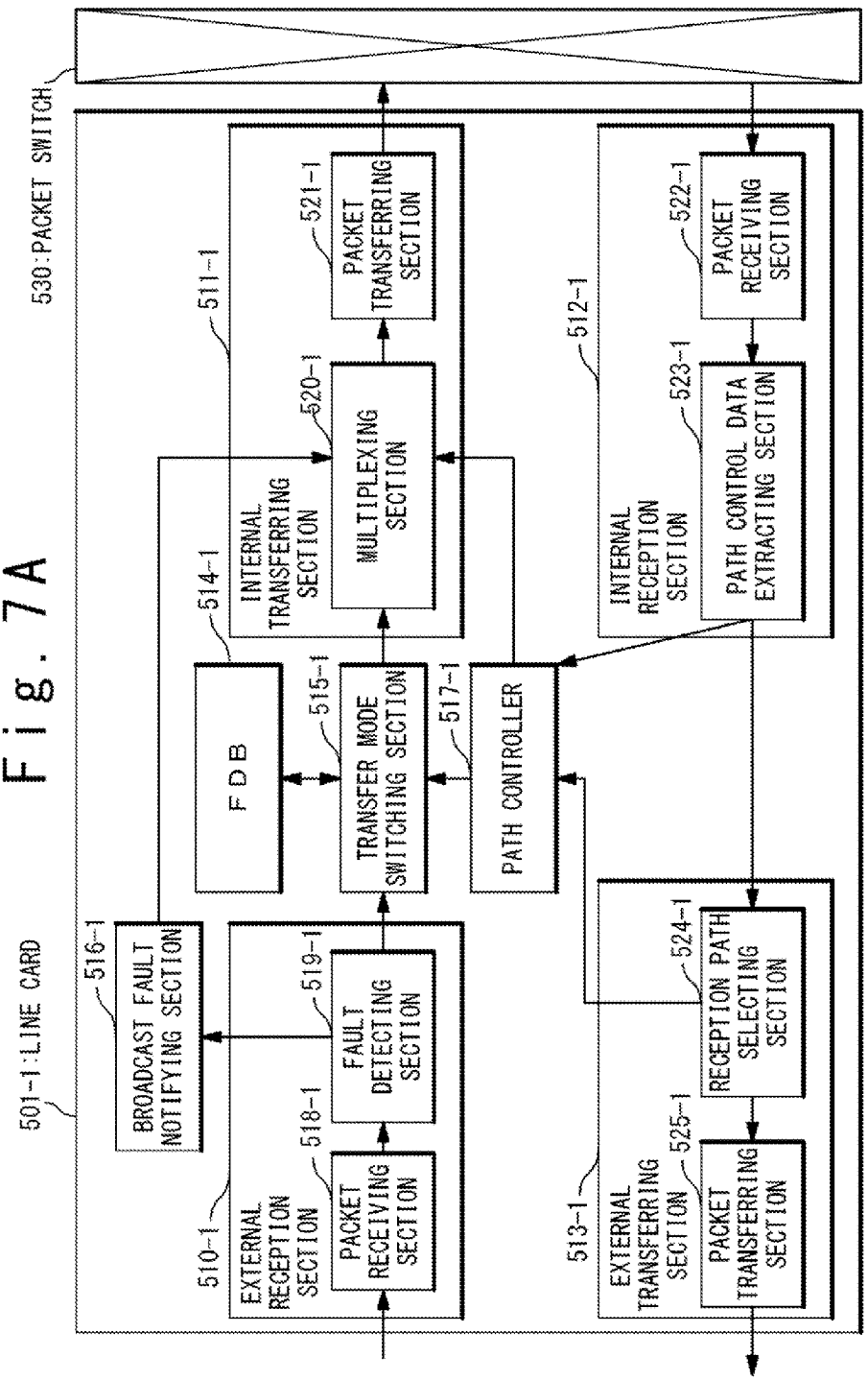

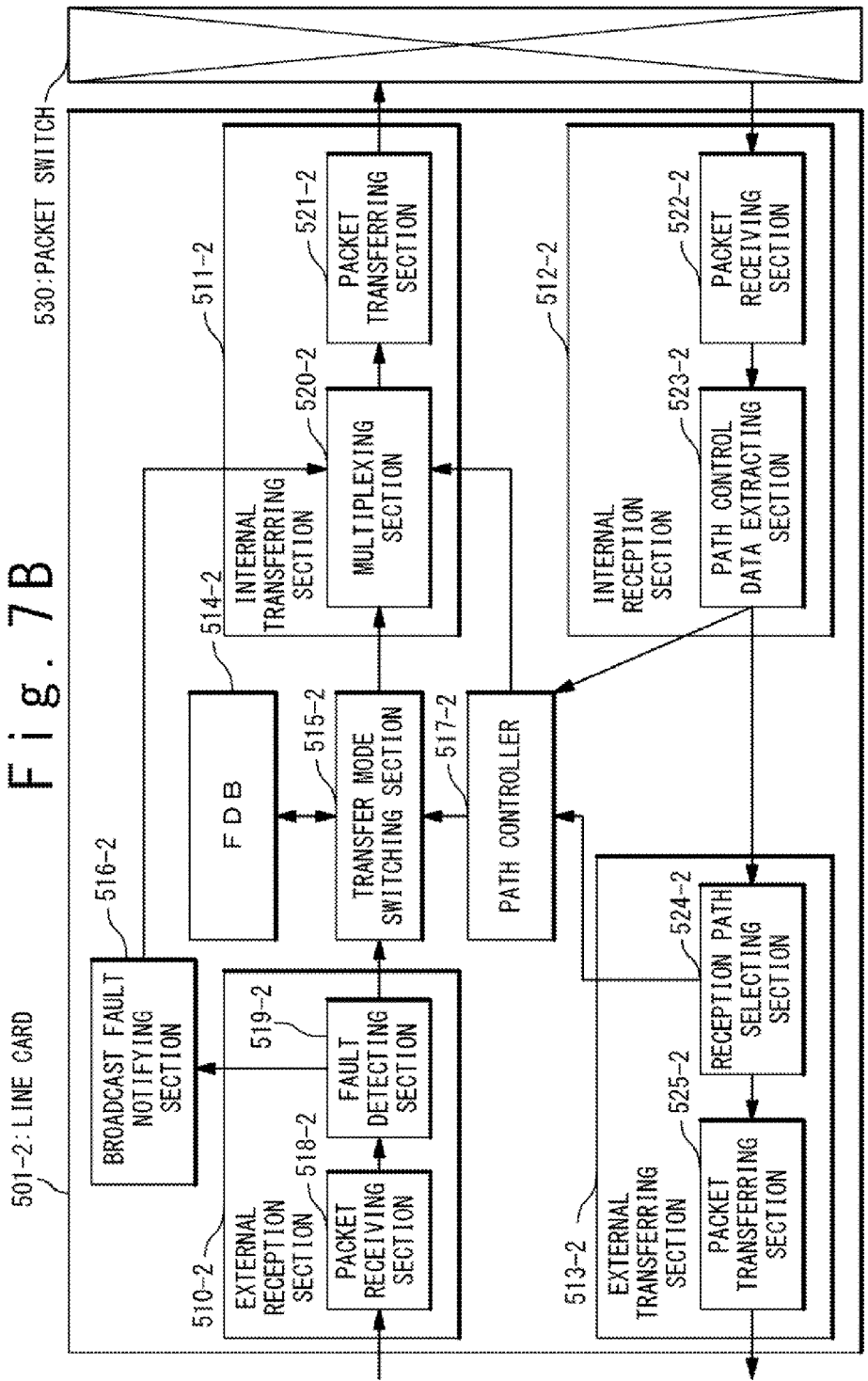

PACKET TRANSMISSION SYSTEM AND FAULT RECOVERY METHOD

CROSS-REFERENCE

This patent application claims a priority on convention based on Japanese Patent Application No. 2010-192255 filed on Aug. 30, 2010. The disclosure thereof is incorporated herein by reference.

TECHNICAL FIELD

The present invention is related to a fault recovery method in a packet transmission network.

BACKGROUND ARTS

In a packet transmission network having a current-use packet transmission path and a spare packet transmission path used when a fault has occurred, a technique is needed in which the packet transmission network is recovered from the fault, by switching the packet transmission path at high speed without imposing a load on the packet transmission network when the fault has occurred, in order to maintain the reliability of the packet transmission network.

As the recovery method in the packet transmission network, a linear fault recovery method is described in ITU-T G. 8032 recommendation (Non-Patent Literature 1). As the linear fault recovery method, there are a fault detection/switching and collecting method and a fault detection/switching and separating method. In the fault detection/switching and collecting method, a termination node in the packet transmission path carries out fault detection and recovery at the same time. In the fault detection/switching and separating method, a node which relays a packet on the packet transmission path detects a fault, transmits a fault notice to a termination node of the packet transmission path, and the termination node receiving the fault notice switches the packet transmission path. Generally, the fault detection/switching and separating method is used.

As an example of the conventional technique, the fault detection/switching and separating method will be described. FIG. 1 is a block diagram showing a packet transmission network 100 of the fault detection/switching and separating method in the conventional technique. The packet transmission network is configured of a node 11 to a node 18. The node 11 and the node 12 are connected through the node 17, and a current-use packet transmission path 110 is set therebetween. Also, the node 11 and the node 12 are connected through the node 16, and a spare packet transmission path 120 to the current-use packet transmission path 110 is set therebetween. The node 13 and the node 14 are directly connected, and a current-use packet transmission path 111 is set therebetween. Also, the node 13 and the node 14 are connected through the node 16, and a spare packet transmission path 121 to the current-use packet transmission path 111 is set therebetween.

When there is not a fault in the packet transmission network 100, the packet transmission is performed by using the current-use packet transmission path 110, and the current-use packet transmission path 111. Each node transmits a continuity check message (CCM) to a neighbor node regularly. Each node manages the activeness or inactiveness of the neighbor node by receiving the CCM regularly.

The case where the fault has occurred in the packet transmission network 100 will be described. It is assumed that a fault has occurred between the node 12 and the node 17. Because the node 12 does not receive the CCM from the node 17, the node 12 detects that the fault has occurred between the node 12 and the node 17. Similarly, because the node 17 does not receive the CCM from the node 12, the node 17 detects that the fault has occurred between the node 12 and the node 17. The node 17 outputs a fault notice data to the node 11 as a termination node of the packet transmission path 110, to indicate that the fault has occurred. The node 11 receives the fault notice data, and the node 12 detects the fault in the current-use packet path 110 by not receiving the CCM from the node 17. The node 12 switches the transmission path to the spare packet transmission path 120 from the current-use packet transmission path 110. In this way, the fault recovery is realized in the packet transmission path.

Next, in the packet transmission network 100, the internal configuration of the node of the fault detection/switching and separating method in the conventional technique will be described. Because the internal configurations of the node 11 to the node 18 are identical to each other, only the node 11 will be described.

FIG. 2A and FIG. 2B are block diagrams showing the configuration of the node 11 in the packet transmission network 100 of FIG. 1. The node 11 is provided with a line card 201-1, a line card 201-2 and a packet switch 230. Because the internal configurations of the line card 201-1 and the line card 201-2 are identical, only the internal configuration of the line card 201-1 will be described.

The line card 201-1 is provided with an external reception section 210-1, an internal transferring section 211-1, an internal reception section 212-1, an external transferring sections 213-1, FDB (transferring database) 214-1, a current-use/spare path switching section 215-1 and a path unit fault notifying section 216-1.

The external reception section 210-1 is provided with a packet receiving section 217-1 and a fault detecting section 218-1. The internal transferring section 211-1 is provided with a multiplexing section 219-1 and a packet transferring section 220-1. The internal reception section 212-1 is provided with a packet receiving section 221-1 and a fault notice data processing section 222-1. The external transferring section 213-1 is provided with a packet transferring section 223-1.

The FDB 214-1 is a table which retains destination data necessary to transfer a packet when transferring the packet, such as a MAC address of a next destination node, and the number of a port connected to a network to which the destination node of the packet is connected.

The current-use/the spare path switching section 215-1 refers to the FDB 214-1 to transfer the reception packet to the next destination node. The packet received from which of the current-use packet transmission path and the spare packet transmission path should be transferred is determined by the fault notice data processing section 222-1 notifying to the current-use/spare path switching section 215-1.

The path unit fault notifying section 216-1 specifies the packet transmission path passing through a faulty section by referring to the FDB 214-1, and generates the fault notice data in units of the packet transmission paths. The path unit fault notifying section 216-1 transfers the fault notice data to the multiplexing section 219-1.

The packet receiving section 217-1 of the node 11 receives the packet transmitted to a port of the line card 201-1 connected to the neighbor node of the node 11

The fault detecting section 218-1 confirms whether a CCM is received from the node connected to the port of the line card 201-1. When the reception of the CCM within a constant time cannot be confirmed, the fault detecting section 218-1 detects that the fault has occurred, and transmits a fault detection notice to the path unit fault notifying section 216-1. The fault detecting section 218-1 transfers a packet except for the CCM to the current-use/spare path switching section 215-1.

The multiplexing section 219-1 multiplexes the packets transferred from the current-use/spare path switching section 215-1 and the path unit fault notifying section 216-1.

The packet transferring section 220-1 transfers the packet which is received from the line card 201-1, toward the line card with a port connected with the next destination the node.

The packet receiving section 221-1 receives the packet from a port of any of the line cards of the nodes 11 through packet switch 230.

The fault notice data processing section 222-1 refers to the received fault notice data and the FDB 214-1 to determine the packet transmission path to be switched, and instructs the current-use/spare path switching section 215-1 to switch the path from the current-use packet transmission path to the spare packet transmission path.

The packet transferring section 223-1 transfers the packet from the port connected with the next destination node which neighbors the node 11.

The packet switch 230 in the node 11 transfers the packet which is received from the port of any of the line cards to the port of the line card which is connected with the destination node.

In the fault detection/switching and separating method of the conventional technique, when a fault has occurred among the nodes for the packet transmission path, a termination node of the packet transmission path generates the fault notice data which contains data for specifying the packet transmission path in which the fault has occurred. The fault notice data unicasted for the termination node of the packet transmission path. The termination node receiving the fault notice data switches the packet transmission path from the current-use packet transmission path to the spare packet transmission path. At that time, there sometimes is a site where the fault has occurred between the nodes of the spare packet transmission path after the switching. In this case, once again, the fault notice data is transmitted to the termination node of the packet transmission path after the switching, and the packet transmission path is switched once again. In this way, in the fault detection/switching and separating method of the conventional technique, when the fault has occurred simultaneously at a plurality of sites, it is assumed to successively switch the packet transmission path, and there is possibility that switching time has been extended.

CITATION LIST

[Non-Patent Literature 1]: ITU-t (international telecommunication union telecommunication standardization sector) G.8032 The Ethernet ring protection method

SUMMARY OF THE INVENTION

The present invention provides recovery from a fault in a packet transmission path at high speed even in the condition that the fault has occurred at a same time in a plurality of the packet transmission paths.

In an aspect of the present invention, a packet transmission system including a plurality of nodes connected by a packet transmission path. A current-use packet transmission path is used as the packet transmission path when a fault does not occur, and a spare packet transmission path is used as the packet transmission path when the fault has occurred. Each of the plurality of nodes includes: a transfer mode switching section configured to switch a transfer mode when transferring a received packet to a destination node to a 1:1 transfer mode or a 1+1 transfer mode, wherein the packet is transferred by the current-use packet transmission path in the 1:1 transfer mode, but the spare packet transmission path is not used, and the packet is transferred by the current-use packet transmission path and the spare packet transmission path in the 1+1 transfer mode; a path controller configured to instruct the transfer mode switching section to switch the transfer mode; a packet transferring section configured to transfer the received packet in the 1:1 transfer mode when the fault does not occur in the packet transmission network; and a reception path selecting section configured to select one of the packets received from the current-use packet transmission path and the spare packet transmission path in the 1+1 transfer mode.

In another aspect of the present invention, a fault recovery method is provided in a packet transmission network which includes a current-use packet transmission path used when a fault has not occurred, and a plurality of spare packet transmission paths used when the fault has occurred. The fault recovery method includes: transferring a reception packet in a 1:1 transfer mode by a packet transferring section of a termination node of the current-use packet transmission path, when the fault has not occurred, wherein in the 1:1 transfer mode, the termination node transfers the reception packet by using only the current-use packet transmission path; detecting the fault between nodes of the current-use packet transmission path by a fault detecting section of the termination node; broadcasting a packet containing a fault notice data to the nodes by the packet transferring section of the termination node, wherein the fault notice data contains a data indicating that the fault has been detected in the current-use packet transmission path; transferring the fault notice data to a neighbor node by the packet transferring section of one node which receives the fault notice data; transmitting a 1+1 transfer mode switching packet by the packet transferring section of the termination node of any packet transmission path which receives the fault notice data; switching a transfer mode from the 1:1 transfer mode to the 1+1 transfer mode by a transfer mode switching section of the termination node which has transmitted the 1+1 transfer mode switching packet, wherein the node transfers the reception packet by using the current-use packet transmission path and the plurality of spare packet transmission paths in the 1+1 transfer mode; selecting the reception packet from one of the current-use packet transmission path and the plurality of spare packet transmission paths by a reception path selecting section of the termination node which receives the reception packet in the 1+1 transfer mode; and transferring the reception packet to a next destination node by the packet transferring section of the termination node which receives the reception packet in the 1+1 transfer mode.

In still another aspect of the present invention, a computer-readable non-transitory storage medium in which a program code is stored is provided to realize a fault recovery method in a packet transmission network which includes a current-use packet transmission path used when a fault has not occurred, and a plurality of spare packet transmission paths used when the fault has occurred. The fault recovery method includes: transferring a reception packet in a 1:1 transfer mode by a packet transferring section of a termination node of the current-use packet transmission path, when the fault has not occurred, wherein in the 1:1 transfer mode, the termination node transfers the reception packet by using only the current-use packet transmission path; detecting the fault between nodes of the current-use packet transmission path by a fault detecting section of the termination node; broadcasting a packet containing a fault notice data to the nodes by the packet transferring section of the termination node, wherein the fault notice data contains a data indicating that the fault has been detected in the current-use packet transmission path; transferring the fault notice data to a neighbor node by the packet transferring section of one node which receives the fault notice data; transmitting a 1+1 transfer mode switching packet by the packet transferring section of the termination node of any packet transmission path which receives the fault notice data; switching a transfer mode from the 1:1 transfer mode to the 1+1 transfer mode by a transfer mode switching section of the termination node which has transmitted the 1+1 transfer mode switching packet, wherein the node transfers the reception packet by using the current-use packet transmission path and the plurality of spare packet transmission paths in the 1+1 transfer mode; selecting the reception packet from one of the current-use packet transmission path and the plurality of spare packet transmission paths by a reception path selecting section of the termination node which receives the reception packet in the 1+1 transfer mode; and transferring the reception packet to a next destination node by the packet transferring section of the termination node which receives the reception packet in the 1+1 transfer mode.

According to the present invention, even in the state that a fault has occurred to at a same time in a plurality of packet transmission paths, the fault in the packet transmission path at high speed can be recovered.

BRIEF DESCRIPTION OF THE DRAWINGS

The above and other objects, advantages and features of the present invention will be more apparent from the following description of certain exemplary embodiments taken in conjunction with the accompanying drawings, in which:

FIG. 2B is a block diagram of one of the nodes which configure the packet transmission network 100 of FIG. 1;

FIG. 7A is a block diagram showing the configuration of each of the nodes which configures the packet transmission network of FIG. 3;

FIG. 7B is a block diagram of each of the nodes which configures the packet transmission network 300 of FIG. 3;

DESCRIPTION OF EXEMPLARY EMBODIMENTS

Hereinafter, a fault recovery of the present invention will be described with reference to the attached drawings.
(Configuration)

Figure 7C:
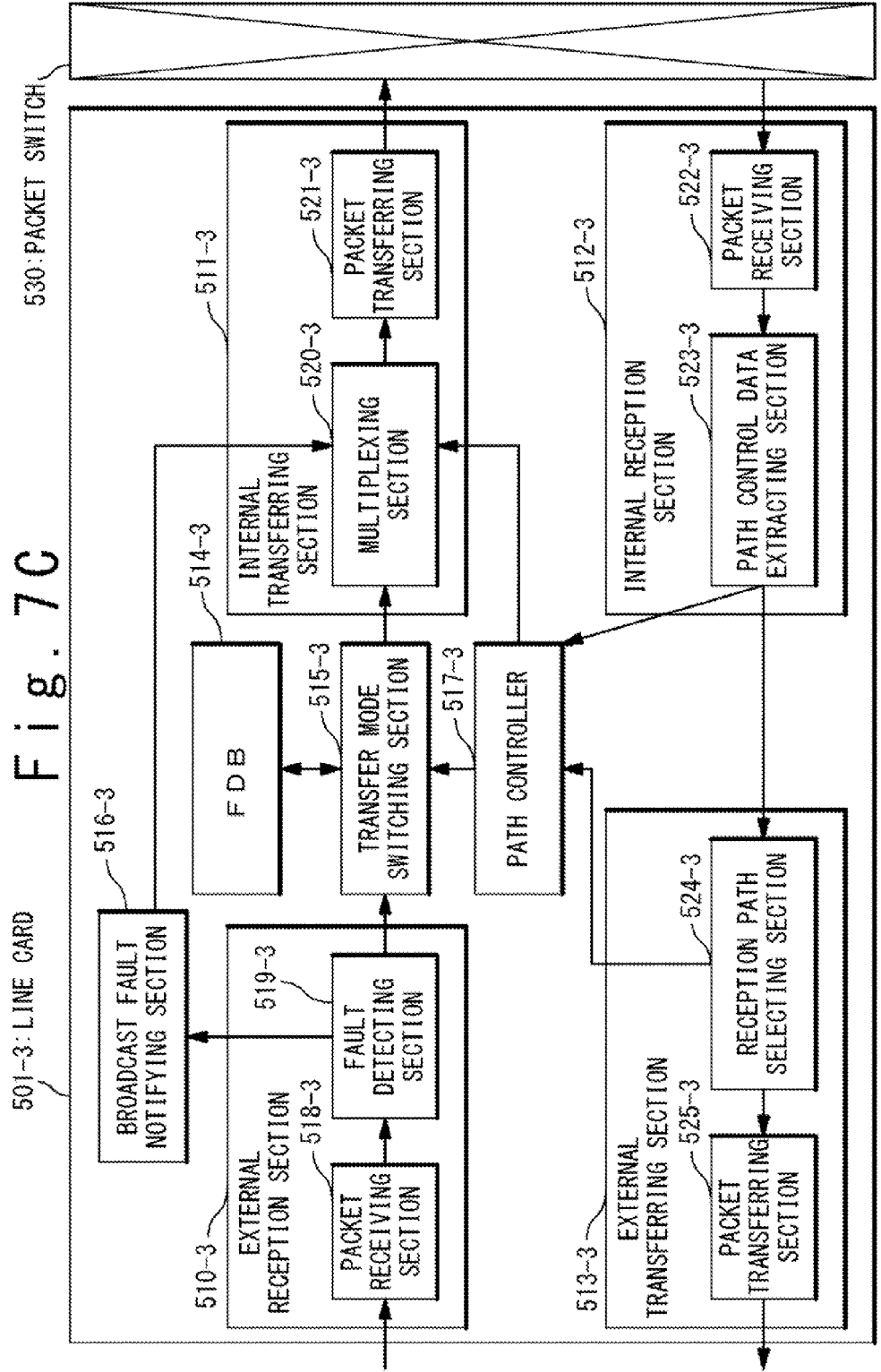
FIG. 7C are a block diagram of the nodes which configures the packet transmission network of FIG. 3.

First, the internal configuration of each of nodes in an exemplary embodiment of the present invention will be described. FIG. 7A, FIG. 7B, and FIG. 7C are block diagrams showing the configuration of each of the nodes which configures a packet transmission network 300 of FIG. 3.

The node is configured of a plurality of line cards 501 (501-1, 501-2, 501-3) and a packet switch 530. The node shown in FIG. 7A, FIG. 7B, and FIG. 7C is configured from three of the line card 501-1, the line card 501-2 and the line card 501-3. The number of line cards to be installed is changed appropriately based on a scale, environment and so on of the packet transmission network to be controlled.

The line card 501-1 is provided with an external reception section 510-1, an internal transferring section 511-1, an internal reception section 512-1, an external transferring section 513-1, an FDB 514-1, a transfer mode switching section 515-1, a broadcast fault notifying section 516-1 and a path controller 517-1.

The external reception section 510-1 is provided with a packet receiving section 518-1 and a fault detecting section 519-1. The internal transferring section 511-1 is provided with a multiplexing section 520-1 and a packet transferring section 521-1. The internal reception section 512-1 is provided with a packet receiving section 522-1 and a path control data extracting section 523-1. The external transferring section 513-1 is provided with a reception path selecting section 524-1 and a packet transferring section 525-1.

Because the line card 501-2 and the line card 501-3 have the same configuration as that of the line card 501-1, each processing section of the line cards will be described by using the line card 501-1 as an example.

The FDB 514-1 is a table which has a destination data which is necessary to transfer a received packet, such as a MAC address of the next destination node, and a number of a port connected to a network as a destination of the packet, upon transfer of the received packet.

The transfer mode switching section 515-1 switches a transfer mode of the packet received by the line card 501-1 to a 1:1 transfer mode or a 1+1 transfer mode.

In the 1:1 transfer mode, the packets are transferred by using the current-use packet transmission path 310 and the current-use packet transmission path 311, and a spare packet transmission path 320 and a spare packet transmission path 321 are not used.

In the 1+1 transfer mode, the packets are transferred by using the spare packet transmission path 320 and the spare packet transmission path 321, in addition to the current-use packet transmission path 310 and the current-use packet transmission path 311. In the 1+1 transfer mode, an identical packet is transferred on the current-use packet transmission path 310 and a corresponding spare packet transmission path 320. In the same way, an identical packet is transferred to the current-use packet transmission path 311 and a corresponding spare packet transmission path 321.

The transfer mode switching section 515-1 refers to the FDB 514-1 to acquire the data necessary to transfer a packet such as the MAC address of the next destination node and the port number of the node 31 to which the next destination node is connected, in order to transfer the packet received by the line card 501-1 to the next destination node. The transfer mode switching section 515-1 transfers the received packet by using one of the current-use packet transmission path and the spare packet transmission path in the 1:1 transfer mode. The transfer mode switching section 515-1 transfers the received packet by using the current-use packet transmission path and the spare packet transmission path in the 1+1 transfer mode. There is a case that a plurality of spare packet transmission paths are provided for the single current-use packet transmission path, depending on the configuration of the packet transmission network.

The transfer mode switching section 515-1 refers to the FDB 514-1 in the 1:1 transfer mode, to acquire data of a next destination node when using a the current-use packet transmission path, or data of a next destination node when using the spare packet transmission path.

The transfer mode switching section 515-1 refers to the FDB 514-1 in the 1+1 transfer mode, to acquire data of the next destination node when using the current-use packet transmission path, and data of the next destination node when using the spare packet transmission path.

The transfer mode switching section 515-1 transmits a 1+1 transfer mode switching packet to the current-use packet transmission path and the spare packet transmission path in case to switch from the 1:1 transfer mode to the 1+1 transfer mode. Oppositely, in case to switch from the 1+1 transfer mode to the 1:1 transfer mode, the transfer mode switching section 515-1 transfers a 1+1 transfer mode cancelling packet to the current-use packet transmission path and the spare packet transmission path. An instruction control between the 1+1 transfer mode the 1:1 transfer mode is performed to the transfer mode switching section 515-1 by the path controller 517-1.

When receiving a fault occurrence notice from the fault detecting section 519-1, a broadcast fault notifying section 516-1 generates a fault notice data to be broadcasted. The fault notice data includes data showing that a fault has been detected in the current-use packet transmission path, but the data for specifying the current-use packet transmission path in which the fault has occurred is not essential. The broadcast fault notifying section 516-1 transfers the generated broadcast fault notice data to the multiplexing section 520-1. As the transmission of the fault notice data, there are a method of transmitting regularly or periodically until the path is recovered, and a method of transmitting several times immediately after the fault has occurred.

The path controller 517-1 instructs the transfer mode switching section 515-1 to switch to the 1+1 transfer mode. When receiving a transmission path selection data from the path control data extracting section 523-1, the path controller 517-1 determines a packet transmission path by a predetermined method, and transfers packet transmission path selection agreement data which contains data for identifying the determined packet transmission path, to the multiplexing section 520-1. In the packet transmission path selection data, the data for selecting the packet transmission path to be used is contained. For example, the data of a packet reception condition such as a bit rate, a packet loss rate and so on of the packet transmission path are contained.

Also, a quality monitoring result of the packet transmission path performed in the reception path selecting section 524-1 is transferred to the path controller 517-1.

The packet receiving section 518-1 receives a packet transmitted from the neighbor node to a port of the line card 501-1.

The fault detecting section 519-1 monitors whether or not a CCM (continuity check message) has been received from the neighbor node connected with the port of the line card 501-1, and detects that a fault has occurred, when the CCM does not arrive within a predetermined time. When detecting the occurrence of the fault, the fault detecting section 519-1 notifies the occurrence of the fault to the broadcast fault notifying section 516-1.

The multiplexing section 520-1 multiplexes packets from the broadcast fault notifying section 516-1, the transfer mode changing receptacle 515-1, and the path controller 517-1.

The packet transferring section 521-1 transfers the packet received by the line card 501-1 to a line card with a port connected with a next destination node.

The packet receiving section 522-1 receives the packet through the port of either of the line cards of the node through the packet switch 530.

The path control data extracting section 523-1 transfers to the path controller 515-7, the fault notice data and the packet transmission path selection data of the packet transmission path for its own interface to be switched, of the packets transferred from the packet switch 530. Also, the path control data extracting section 523-1 generates and transfers a CCM to the neighbor node.

The reception path selecting section 524-1 selects either of the current-use packet transmission path or the spare packet transmission path by monitoring the quality of the packet transmission path and receives the packet of the selected path from the packets received in the 1+1 transfer mode. The reception path selecting section 524-1 transfers the packet received from the line card 501-1 to the next destination node. The reception path selecting section 524-1 transfers the received packet to the next destination node without selecting the received packet in the 1:1 transfer mode. The selecting process of the received packet will be described below.

The packet transferring section 525-1 transfers a packet to the outside from the port which the next destination node is connected.

When receiving the packet from the line card, the packet switch 530 transfers the packet to the line card with the port to which the destination node is connected.

(Operation)

Next, the recovery method of the packet transmission network 300 in the present exemplary embodiment of the present invention will be described.

Figure 1:
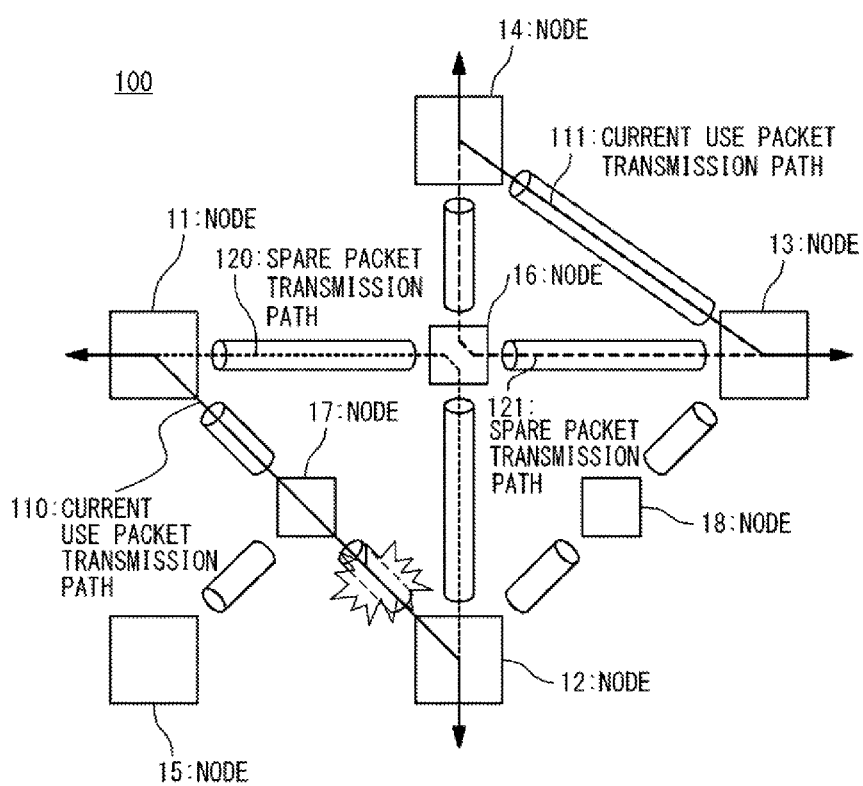
FIG. 1 is a diagram showing a packet transmission network 100 to explain fault detection/switching and separation method in conventional art.
Figure 2A:
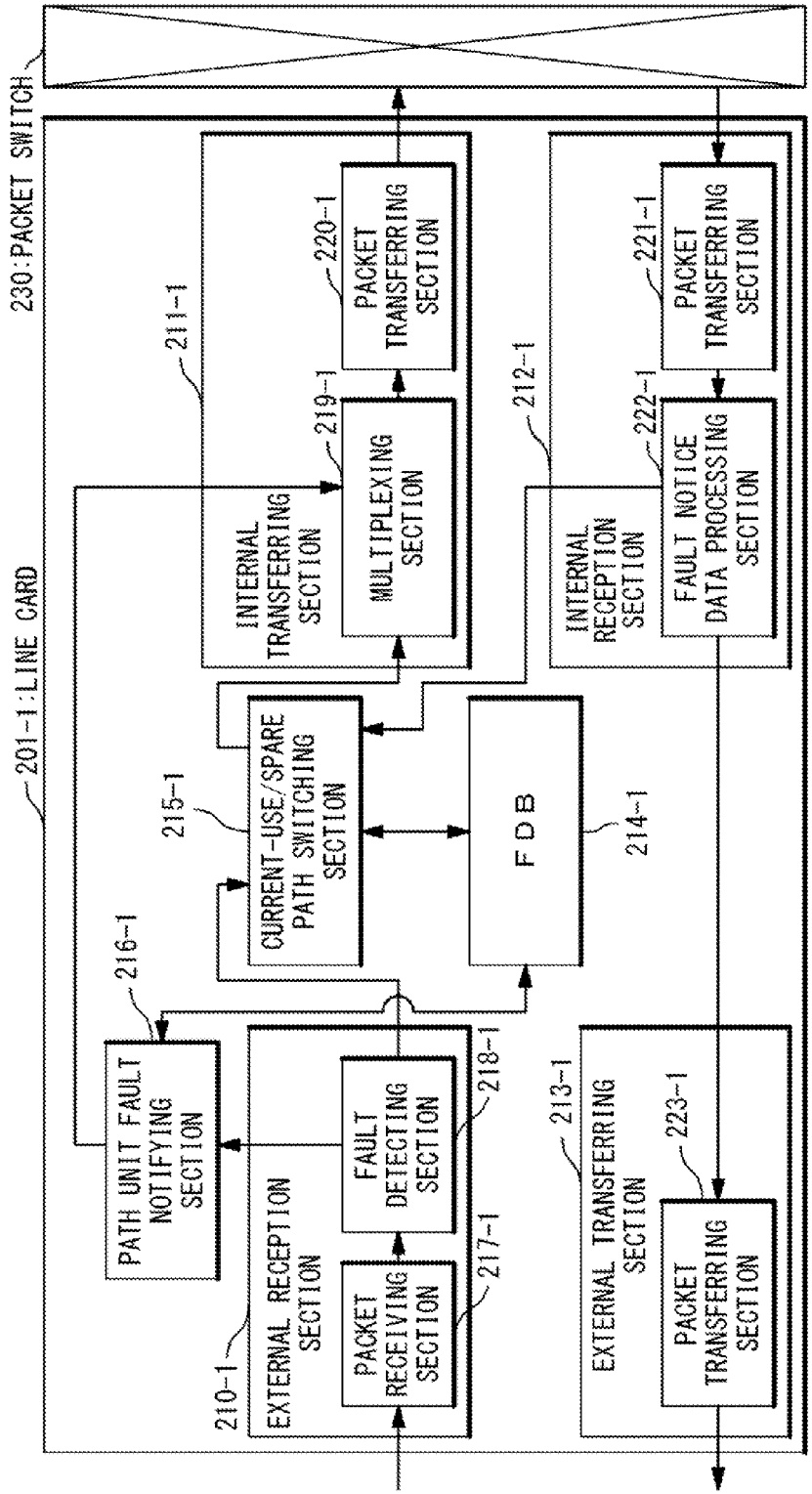
FIG. 2A is a block diagram of one of nodes which configure the packet transmission network of FIG. 1.
Figure 3:
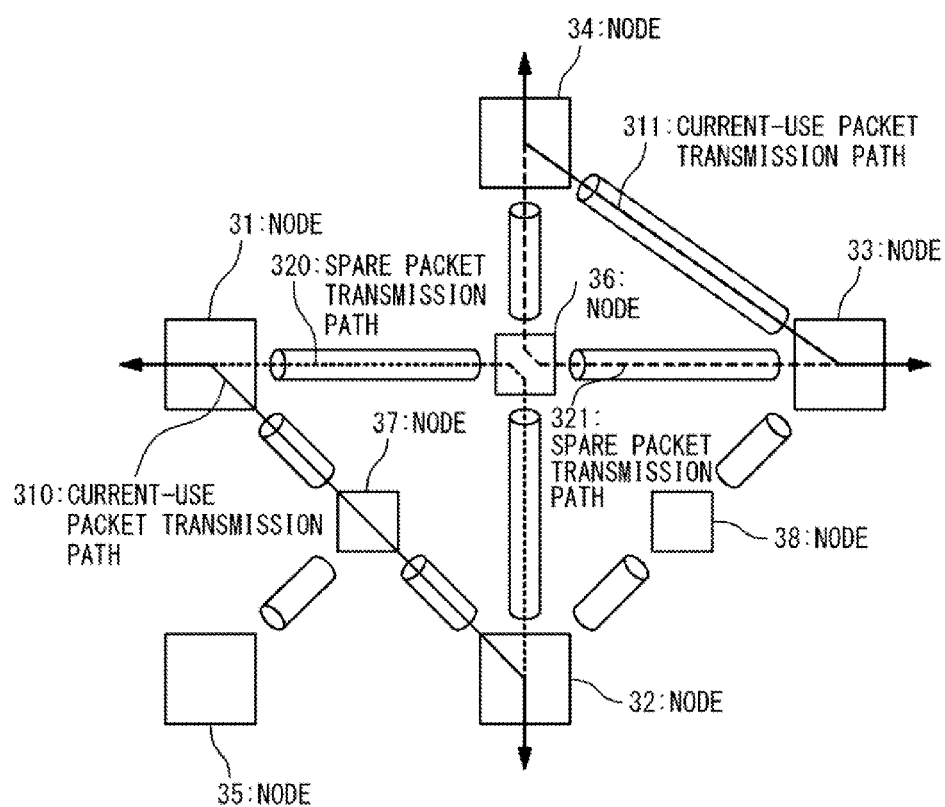
FIG. 3 is a diagram showing a packet transmission network in which the fault does not occur to in the present exemplary embodiment of the present invention does.

First, a communication condition when any fault does not occur in the packet transmission network 300 will be described. FIG. 3 is the packet transmission network 300 according to the present exemplary embodiment of the present invention in which any fault does not occur. The packet transmission network 300 is configured from nodes 31 to 38. The nodes 31 and 32 are connected through the node 37, and the current-use packet transmission path 310 is set. Also, the nodes 31 and 32 are connected through the node 36, and the spare packet transmission path 320 is set. The nodes 33 and 34 are directly connected with each other, and the current-use packet transmission path 311 is set. Also, the nodes 33 and 34 are connected through the node 36, and the spare packet transmission path 321 is set. When there is not a fault in the packet transmission network 300, it is supposed that the packet transmission is performed by using the current-use packet transmission path 310 and the current-use packet transmission path 311.

Each of the nodes 31 to 38 receives the CCM transmitted periodically from the neighbor node and monitors the validity of the packet transmission path between the neighbor nodes.

When the fault does not occur in the packet transmission network 300, the packet is transferred by using the current-use packet transmission path 310 and the current-use packet transmission path 311, and the spare packet transmission path 320 and the spare packet transmission path 321 are not used (the 1:1 transfer mode).

First, with reference to FIG. 3, FIG. 7A, FIG. 7B, and FIG. 7C, the operation in the 1:1 transfer mode will be described by using the node 31 as an example. The transfer of the packet received by the port of the line card 501-1 as an example will be described. The node 37 as the next destination node is connected to the port of the line card 501-2, when transferring the packet by using the current-use packet transmission path 310. The node 36 as the next destination node is connected to the port of the line card 501-3, when transferring the packet by using the spare packet transmission path 320.

The packet received by the packet receiving section 518-1 of the external reception section 510-1 is transferred to the transfer mode switching section 515-1 through the fault detecting section 519-1. Because the 1:1 transfer mode is set, the transfer mode switching section 515-1 transfers the packet only to the node 37 as the next destination node when using the current-use packet transmission path 310. The received packet is transferred in order of the multiplexing section 520-1, the packet transferring section 521-1, the packet switch 530, the packet receiving section 522-2, the path control data extracting section 523-2, the reception path selecting section 524-2, the packet transferring section 525-2 in the node 31, and is transferred from the node 31 to the node 37.

Next, the case where the fault has occurred in the packet transmission network 300 will be described. When the fault has occurred in the packet transmission network 300, the switching between the current-use packet transmission path 310 and the spare packet transmission path 320 is performed by the node 31 and the node 32 as termination nodes. In the same way, the nodes 33 and 34 as termination nodes perform the switching between the current-use packet transmission path 311 and the spare packet transmission path 321.

Figure 4:
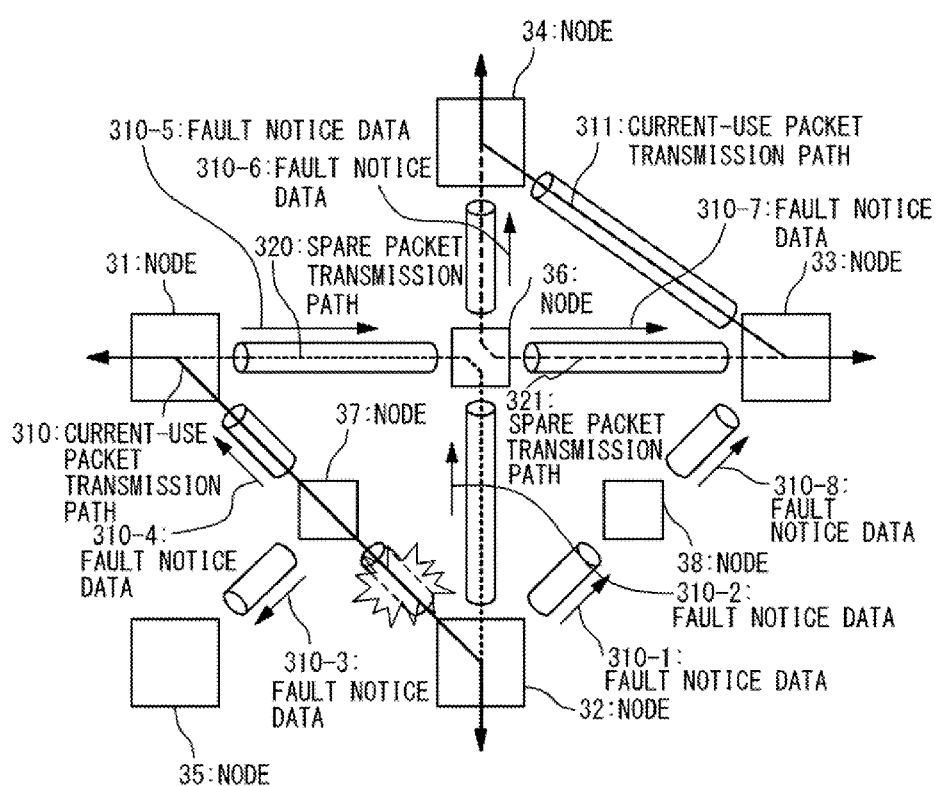
FIG. 4 is a diagram showing the packet transmission network in case of the fault occurrence in the present exemplary embodiment of the present invention.

FIG. 4 is the packet transmission network 300 in case of the occurrence of the fault in the present exemplary embodiment of the present invention. In FIG. 4, it is assumed that the fault has occurred between the node 32 and the node 37. Because the CCM from the node 37 cannot be received in the predetermined time, the node 32 detects that the fault has occurred between the node 32 and the node 37. In the same way, because the CCM from the node 32 cannot be received in the predetermined time, the node 37 detects that the fault has occurred between the node 32 and the node 37.

Because detecting the faults, the node 32 and the node 37 generate and broadcast the fault notice data to the neighbor nodes, respectively. The nodes 31 to 38 receive the fault notice data and transfer the fault notice data to the neighbor nodes. When the node already received the fault notice data, the fault notice data is not transferred to the neighbor node.

Figure 5:
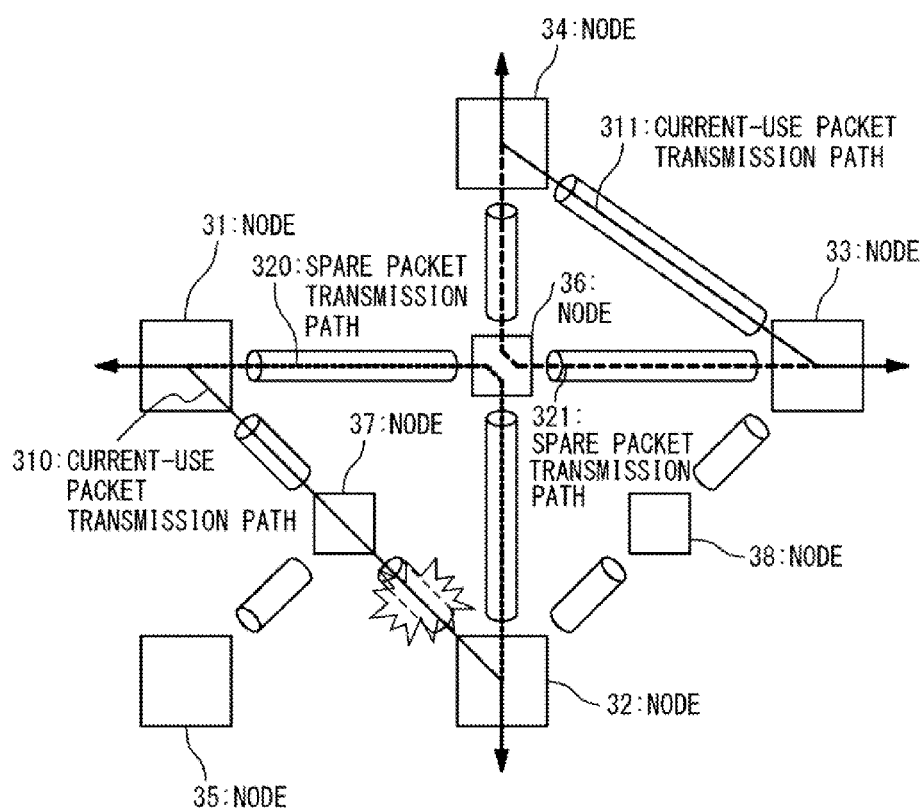
FIG. 5 is the packet transmission network 300 at the time of the 1+1 transfer mode in the present exemplary embodiment of the present invention.

When the node receiving the fault notice data is a termination node in either of the packet transmission paths, the packet transmission to the spare packet transmission path is started in addition to the current-use packet transmission path. Through this operation, the identical packet is transferred onto the current-use packet transmission path and the spare packet transmission path (the 1+1 transfer mode). FIG. 5 is the packet transmission network 300 in the 1+1 transfer mode in the present exemplary embodiment of the present invention. In FIG. 5, the nodes 31 and 32 are the termination nodes in the current-use packet transmission path 310, and the nodes 33 and 34 are the termination nodes in the current-use packet transmission path 311. When receiving the fault notice data, the nodes 31 and 32 start the packet transmission onto the spare packet transmission path 320 in addition to the current-use packet transmission path 310. In the same way, when receiving the fault notice data, the nodes 33 and 34 start the packet transmission onto the spare packet transmission path 321 in addition to the current-use packet transmission path 311. The fault does not occur on the current-use packet transmission path 311, but when receiving the fault notice data, the nodes 33 and 34 perform the switching from the 1:1 transfer mode to the 1+1 transfer mode between the node 33 and the node 34.

After switched to the 1+1 transfer mode, the nodes 31 and 32 monitor the quality of the current-use packet transmission path 310 and the spare packet transmission path 320. The quality monitoring is performed by calculating a bit rate of the packet received from the packet transmission path. Because the fault has occurred in the current-use packet transmission path 310 so that the packet cannot be received, the packet transmission path with high quality is the spare packet transmission path 320. The nodes 31 and 32 transfer the received packet to the next destination node by the spare packet transmission path 320 of high quality.

In the same way, after switched to the 1+1 transfer mode, the nodes 33 and 34 monitor the quality of the current-use packet transmission path 311 and the spare packet transmission path 321. Because the fault does not occur in the current-use packet transmission path 311, the transmission and reception of the packet is possible. When it is possible to use both of the current-use packet transmission path and the spare packet transmission path in similar quality, the nodes 31 and 32 select the current-use packet transmission path 311, because it is not necessary to switch to the spare packet transmission path.

Figure 6:
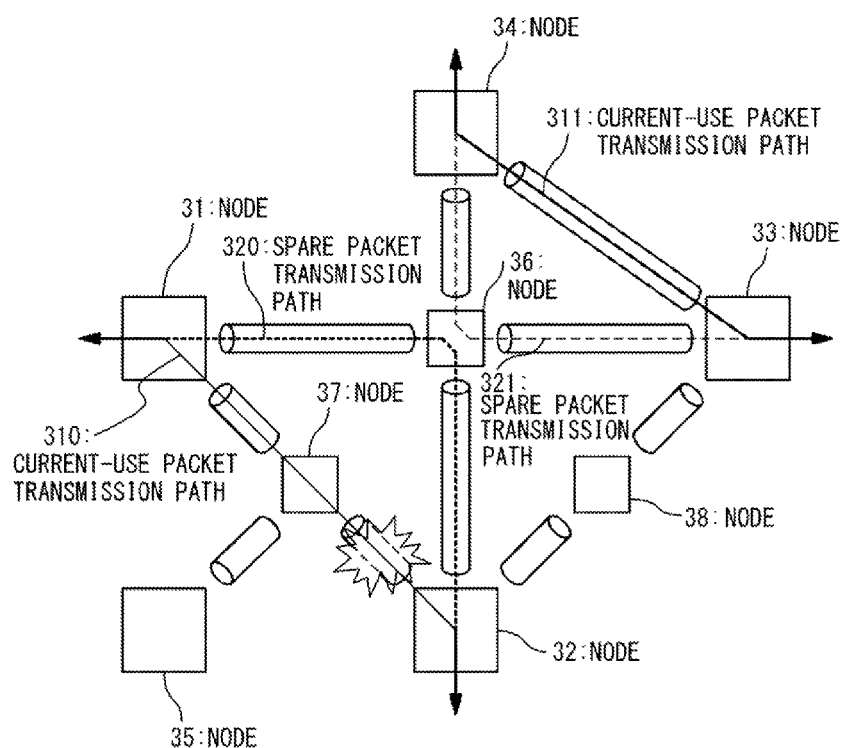
FIG. 6 is a diagram showing the configuration of the packet transmission network in 1+1 transfer mode in the packet transmission network according to the present exemplary embodiment of the present invention.

FIG. 6 is the packet transmission line 300 in cancellation of the 1+1 transfer mode in the present exemplary embodiment of the present invention. After determining the packet transmission path to be used for the transfer of the received packet as the spare packet transmission path 320, the nodes 31 and 32 stop the transferring of the packet by using the current-use packet transmission path 310, and switches from the 1+1 transfer mode to the 1:1 transfer mode in which the spare packet transmission path is used. After determining the packet transmission path to be used for the transfer of the received packet as the current-use packet transmission path 311, the nodes 33 and 34 stops the transfer of the packet by using the spare packet transmission path 321, and switches from the 1+1 transfer mode to the 1:1 transfer mode in which the current-use packet transmission path 311 is used.

As mentioned above, in the present exemplary embodiment of the present invention, the node detects the fault occurrence, and generates the fault notice data to broadcast to the other nodes. When the node which receives the fault notice data is a termination node in any of the packet transmission paths, the transfer mode is switched to the 1+1 transfer mode uniformly by regarding as the fault occurrence, regardless of the existence or non-existence of the fault in the packet transmission path. After that, one of the packet transmission paths is selected, and the transfer mode is switched from the 1+1 transfer mode to the 1:1 transfer mode. Because the fault notice data is not generated for each of the packet transmission paths, it is not necessary to perform processing on data for specifying the packet transmission path. Because a processing quantity can be more reduced, as compared with a conventional case, there are not a problem of straining a bandwidth of the packet transmission path, a problem of the delay of generation of the fault notice data and so on. Also, when the fault has occurred, especially, when the faults have occurred in the plurality of packet transmission paths at the same time, a delay does not occur in the recovery of the packet transmission paths in the fault recovery method in the present exemplary embodiment in which operations of all the packet transmission paths are carried out in an integrated fashion.

Figure 8A:
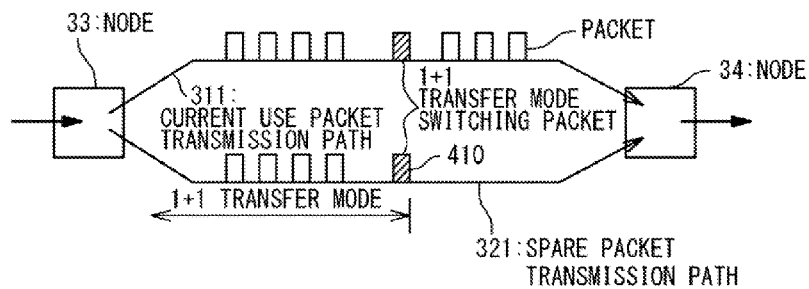
FIGS. 8A, 8B and 8C are diagram showing the switching of the packet transfer mode in the present exemplary embodiment of the present invention.
Figure 8B:
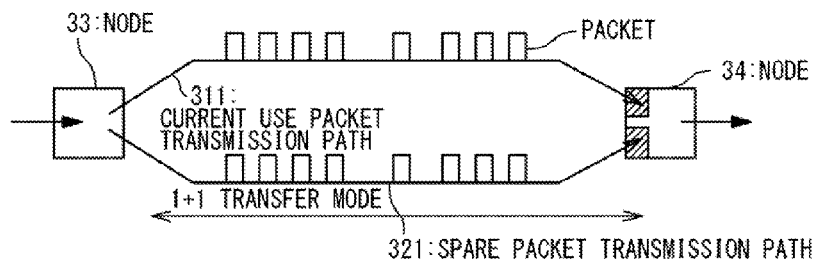
Figure 8C:
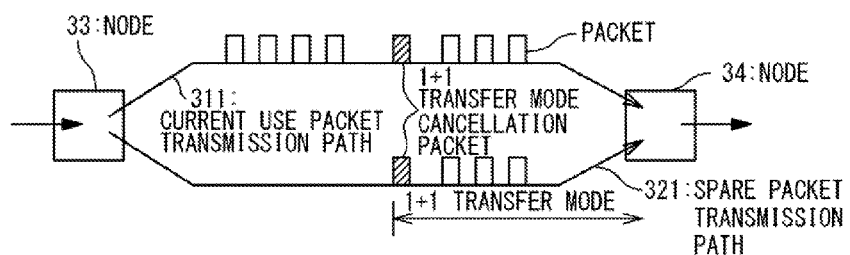

Next, the details of the switching operation of the packet transfer mode will be described. FIGS. 8A, 8B and 8C are diagrams showing the switching of the packet transfer mode in the present exemplary embodiment of the present invention. FIGS. 8*a*, 8B and 8C show packet transfer states to the current-use packet transmission path 311 and the spare packet transmission path 321 between the nodes 33 and 34. The switching operation of the packet transfer mode will be described by using the transfer of a packet in one direction from the node 33 to the node 34 as an example.

When receiving the fault notice data from the neighbor node, the node 33 transmits the 1+1 transfer mode switching packet to the current-use packet transmission path 311 and the spare packet transmission path 321 at a same time. After that, the node 33 transfers the received packet to the current-use packet transmission path 311 and the spare packet transmission path 321 at the same time, and the transfer mode shifts to the 1+1 transfer mode.

FIG. 8A is a diagram showing before and after transmitting the 1+1 transfer mode switching packet 410 from the node 33 to the node 34. In FIG. 8A, the packet transfer mode between the nodes 33 and 34 is switched from the 1:1 transfer mode in which the current-use packet transmission path 311 is used, to the 1+1 transfer mode in which the current-use packet transmission path 311 and the spare packet transmission path 321 are used, after transmission of the 1+1 transfer mode switching packet.

FIG. 8B is a diagram showing the operation when the node 34 receives the 1+1 transfer mode switching packet 410. The packet transfer mode between the nodes 33 and 34 is set to the 1:1 transfer mode in which the packet transmission path 311 and the packet transmission path 321 are used. When the node 34 receives the 1+1 transfer mode switching packet, the quality monitoring of the current-use packet transmission path 311 and the spare packet transmission path 321 is started. The quality monitoring is carried out by calculating a bit rate and so on. The packet received from the packet transmission path with the higher quality is transferred to the next destination node. The node 34 retains the packet received during the quality monitoring in a buffer without transferring to the next destination node until the quality monitoring ends.

FIG. 8C is a diagram showing an operation before and after the node 33 transmits the 1+1 transfer mode cancelling packet 411 to the node 34. In FIG. 8C, the packet transfer mode between the nodes 33 and 34 is switched from the 1+1 transfer mode in which the current-use packet transmission path 311 and the spare packet transmission path 321 are used, to the 1:1 transfer mode in which the current-use packet transmission path 311 is used, after transmission of the 1+1 transfer mode cancelling packet.

The packet transmission path to be use in the 1:1 transfer mode may be determined based on the result of exchange of the packet transmission path selection data by the nodes 33 and 34 and may be determined based on the result of the quality monitoring in the 1+1 transfer mode shown in FIG. 8B. Also, as a method of selecting the packet transmission path, there are a method of selecting the packet transmission path to receive the 1+1 transfer mode switching packet earliest, a method of selecting the current-use packet transmission path with a priority, and a method of selecting the spare packet transmission path with a priority, and so on.

In FIG. 8C, the packet transmission path to be used in the 1:1 transfer mode is determined as the current-use packet transmission path 311 which is the packet transmission path having used before switched in the 1+1 transfer mode. In such a case, it is assumed that the node 33 receives the fault notice data in the state that the fault does not occur in the current-use packet transmission path. When the current-use packet transmission path is determined to be a high quality by the node 33 and the node 34 for the reason that the fault does not occur in the current-use packet transmission path, it is desirable to use the current-use packet transmission path, in order to prevent an unnecessary switching operation to the spare packet transmission path.

In the transmission of the 1+1 transfer mode cancelling packet, there are a method of transmitting it when a constant time has elapsed after switching to the 1+1 transfer mode, or a method of transmitting it when a packet is transmitted to a transmission side node to indicate the completion of selection and is received, after the termination node on the reception side has selected the packet transmission path based on a result of the quality monitoring in the 1+1 transfer mode.

In the present exemplary embodiment of the present invention, the node on the transmission side switches the packet transfer mode from the 1+1 transfer mode to the 1:1 transfer mode when transmitting the 1+1 transfer mode cancelling packet. Therefore, even if the packet transmission path selected through the quality monitoring in the 1+1 transfer mode is different from the packet transmission path selected between the nodes on switching to the 1:1 transfer mode, the problems can be prevented of double transmission of the identical packet, the disorder of the packet transmission order, the packet loss and so on, by switching of the packet transmission path.

Next, the internal operation of the node in case of the fault occurrence in the present exemplary embodiment of the present invention will be described. First, the case where its own node detects a fault will be described. As an example, with reference to FIG. 4, FIG. 7A, FIG. 7B, and FIG. 7C, the internal operation of the node 32 in case where the packet transfer mode of the packet transmission path between the nodes 31 and 32 is switched when the fault has occurred between the nodes 32 and 37 will be described. It is assumed that with respect to the state of the connection between the node 32 and another node, the port of the line card 501-1 of the node 32 is connected with the node 36, the port of the line card 501-2 of the node 32 is connected with the node 37, and the port of the line card 501-3 of the node 32 is connected with the node 38.

Because the reception of the CCM from the node 37 cannot be confirmed in a predetermined time, the fault detecting section 519-2 of the node 32 detects that the fault has occurred. The fault detecting section 519-2 of the node 32 transmits a fault detection notice to the broadcast fault notifying section 516-2.

The broadcast fault notifying section 516-2 generates one fault notice data. The broadcast fault notifying section 516-2 transfers the fault notice data to the packet switch 530 through the multiplexing section 520-2 and the packet transferring section 521-2.

The packet switch 530 transfers the fault notice data to all the line cards 501-1 to 501-3 installed on the node 32. Because the operation when receiving the fault notice data from the packet switch 530 is same even in any of the line cards, the operation will be described, by using the line card 501-3 as an example, hereinafter.

The line card 501-3 receives the fault notice data by the packet receiving section 522-3 of the internal reception section 512-3. The packet receiving section 522-3 transfers the fault notice data to the path control data extracting section 523-3. The path control data extracting section 523-3 transfers the fault notice data to the path controller 517-3 and the reception path selecting section 524-3. The reception path selecting section 524-3 transfers the fault notice data to the packet transferring section 525-3. The packet transferring section 525-3 transmits the fault notice data to the neighbor node.

When receiving the fault notice data from the path control data extracting section 523-3, the path controller 517-3 instructs the transfer mode switching section 515-3 to switch the transfer mode to the 1+1 transfer mode.

When receiving a switching instruction from the path controller 517-3, the transfer mode switching section 515-3 generates the 1+1 transfer mode switching packet. The transfer mode switching section 515-3 refers to the FDB 514-3, to detect all the packet transmission paths which are connected with the ports of the line card 501-3 of the node 32. The transfer mode switching section 515-3 transfers the 1+1 transfer mode switching packet to the multiplexing section 520-3 of the internal transferring section 511-3, in order to transfer the 1+1 transfer mode switching packet to the detected termination node of the packet transmission path. After that, the transfer mode switching section 515-3 copies the packet received by the port of the line card 501-3, and transfers the received packet by using the current-use packet transmission path and the spare packet transmission path. In an example of FIG. 4, when transmitting the packet received from the node 38 to the node 31, the packet received by the packet receiving section 518-3 of the external reception section 510-3 is copied by the transfer mode switching section 515-3 in the node 32. The transfer mode switching section 515-3 refers to the FDB 514-3, to transmit the packet to the node 31 by using both of the packet transmission path 310 and the packet transmission path 320.

Next, a case where the packet received in the 1+1 transfer mode is transferred to the next destination node will be described. The case where the node 32 transfer to the node 38, the packet received from the current-use packet transmission path 310 and the spare packet transmission path 320 will be described, by using it as an example. After switching to the 1+1 transfer mode, the reception path selecting section 524-3 of the node 32 carries out the quality monitoring with respect to the packets received from the current-use packet transmission path 310 and the spare packet transmission path 320. Because the fault has occurred in the current-use packet transmission path 310 so that the packet cannot be received, the packet transmission path with high quality becomes the spare packet transmission path 320. The reception path selecting section 524-3 transfers to the next destination node, the packet received from the spare packet transmission path 320.

Next, the case where the transfer mode is switched from the 1+1 transfer mode to the 1:1 transfer mode will be described. The node 32 receives the packet transmission path selection data from the node 31. The packet transmission path selection data is transferred by using either one of the current-use packet transmission path 310 and the spare packet transmission path 320 or both. In the example of FIG. 4, because the fault has occurred in the current-use packet transmission path 310, the case where the node 32 receives the packet transmission path selection data from the spare packet transmission path 320 will be described. The node 32 extracts the packet transmission path selection data by the path control data extracting section 523-1 of the line card 501-1, and transfers to the path controller 517-1. The path controller 517-1 refers to the packet transmission path selection data to determine the packet transmission path uniquely. The path controller 517-1 transfers to the multiplexing section 520-1, the packet transmission path selection agreement data containing the data which distinguishes the uniquely determined packet transmission path, and transfers toward the node 31. After that, the transfer mode switching section 515-1 is instructed to switch from the 1+1 transfer mode to the 1:1 transfer mode.

The transfer mode switching section 515-1 transfers the 1+1 transfer mode cancelling packet to the current-use packet transmission path 310 and the spare packet transmission path 320. After transmission of the 1+1 transfer mode cancelling packet, the transfer mode switching section 515-1 transmits the packet only to the uniquely determined spare packet transmission path 320.

The above is the internal operation of the node when a fault is detected in its own node.

Next, the operation when another node detects the fault, and the fault notice data generated by the other node is received will be described. For example, when receiving the fault notice data from the line card 501-2 of the node 31, the fault notice data is transferred to the line card 501-1 to 501-3 through the packet switch 530. The processing since then is same as the processing when detecting the fault in its own node and generating the fault notice data.

As mentioned above, in this exemplary embodiment, when a node of the packet transmission network 300 detects a fault, the node does not generate the fault notice data for each of the packet transmission paths. Therefore, the node never processes the fault notice data for each of the packet transmission paths. In this exemplary embodiment, the node having detected the fault generates and broadcasts single fault notice data. The termination node on the packet transmission path has received the fault notice data and switches the mode to the 1+1 transfer mode uniformly, regarding as the fault occurrence, even when the fault does not occur in the packet transmission path. After that, the node switches to the 1:1 transfer mode. In the recovery method of the present exemplary embodiment, even when the fault has occurred at a same time among the plurality of packet transmission paths, the successive switching of the packet transmission path due to the detection of the fault in the packet transmission path never occurs. Therefore, the switching time is never elongated and can recover the fault in the packet transmission path at high speed.

As described above, the exemplary embodiments of the present invention have been described with reference to the drawings. However, the present invention is not limited to the above embodiments and can be appropriately modified by a person in the art in a range which does not deviate from the scope of the present invention.

What is claimed is:

1. A packet transmission system comprising a packet transmission network which includes a plurality of nodes, wherein two of said plurality of nodes are adapted to be selected as a first pair of termination nodes between which a first current-use packet transmission path and at least one first spare packet transmission path are defined, and other two of said plurality of nodes are adapted to be selected as a second pair of termination nodes between which a second current-use packet transmission path and at least one second spare packet transmission path are defined, wherein said plurality of nodes are configured to detect a fault in said packet transmission network, wherein, when no fault occurs, packets are transmitted between said first pair of termination nodes and between said second pair of termination nodes in a 1:1 transfer mode when no fault occurs, wherein, in said 1:1 transfer mode, said first and second pairs of termination nodes transfer packets via said first and second current-use packet transmission paths, respectively, without using said first and second spare packet transmission paths;

when said fault is detected in said first current-use packet transmission path, both of said packet transmissions between said first pair of termination nodes and between said second pair of termination nodes are switched from said 1:1 transfer mode to a 1+1 transfer mode, wherein, in said 1+1 transfer mode, said first pair of termination nodes operate to transfer packets by using both of said first current-use packet transmission path and said first spare packet transmission path and said second pair of termination nodes operate to transfer packets by using both of said second current-use packet transmission path and said second spare packet transmission path, wherein each of said plurality of nodes comprises:

a transfer mode switching section configured to switch a transfer mode of said each of said plurality of nodes between said 1:1 transfer mode and said 1+1 transfer mode;

a path controller configured to instruct said transfer mode switching section to switch the transfer mode;

a packet transferring section configured to transfer packets in said 1:1 transfer mode when the fault does not occur in said packet transmission network; and a reception path selecting section configured to, when said each of said plurality of nodes is selected as any of said second pair of termination nodes and the packet transmission between said second pair of termination nodes is performed in said 1+1 transfer mode, select one of the packets received from said second current-use packet transmission path and said second spare packet transmission path, wherein said each of said plurality of nodes further comprises:

a fault detecting section configured to detect a fault between a neighbor node and said each of said plurality of nodes;

a broadcast fault notifying section configured to generate fault notice data for broadcast in response to a fault detection notice from said fault detecting section, wherein the fault notice data contains data indicating that the fault has been detected; and a path control data extracting section configured to transfer the fault notice data to said path controller, wherein said packet transferring section externally transfers said fault notice data to one or more other nodes, and wherein said path controller instructs said transfer mode switching section to switch the transfer mode of said each of said plurality of nodes to said 1+1 transfer mode in response to the fault notice data in a case that said each of said plurality of nodes is selected as one of said second pair of termination nodes, even when no fault is detected in said second current-use packet transmission path.

2. The packet transmission system according to claim 1, wherein each of said plurality of nodes is configured to generate fault notice data when detecting a fault between a neighbor node and said each of said plurality of nodes, to broadcast said fault notice data to one or more other nodes, wherein a node of said plurality nodes which receives the fault notice data transfers the fault notice data to said neighbor node of said plurality nodes, and wherein operations of said first and second pair of termination nodes are switched to said 1+1 transfer mode in response to said fault notice data.

3. The packet transmission system according to claim 1, wherein when said packet transmission between said second pair of termination nodes is performed in said 1+1 transfer mode, each of said second pair of termination nodes selects a selected packet transmission path from said second current-use packet transmission path and said second spare packet transmission path and transfers a reception packet received through said selected packet transmission path to a next destination node.

4. A fault recovery method in a packet transmission network which comprises a plurality of nodes and is adapted to a packet transmission using a first current-use packet transmission path and at least one first spare packet transmission path which are defined between a first pair of termination nodes selected from said plurality of nodes and a packet transmission using a second current-use packet transmission path and at least one second spare packet transmission path which are defined between a second pair of termination nodes selected from said plurality of nodes, said fault recovery method comprising:

transferring packets between said first pair of termination nodes and between said second pair of termination nodes in a 1:1 transfer mode when no fault occurs, wherein, in said 1:1 transfer mode, said first and second pairs of termination nodes transfer packets via said first and second current-use packet transmission paths without using said first and second spare packet transmission paths;

detecting a fault in said packet transmission network by said plurality of nodes;

when said fault is detected in said first current-use packet transmission path, switching both of said packet transmissions between said first pair of termination nodes and between said second pair of termination nodes from said 1:1 transfer mode to a 1+1 transfer mode, wherein, in said 1+1 transfer mode, said first pair of termination nodes operate to transfer packets by using both of said first current-use packet transmission path and said first spare packet transmission path and said second pair of termination nodes operate to transfer packets by using both of said second current-use packet transmission path and said second spare packet transmission path, wherein each of said plurality of nodes comprises:

a transfer mode switching section configured to switch a transfer mode of said each of said plurality of nodes between said 1:1 transfer mode and said 1+1 transfer mode;

a path controller configured to instruct said transfer mode switching section to switch the transfer mode;

a packet transferring section configured to transfer packets in said 1:1 transfer mode when the fault does not occur in said packet transmission network; and a reception path selecting section configured to, when said each of said plurality of nodes is selected as any of said second pair of termination nodes and the packet transmission between said second pair of termination nodes is performed in said 1+1 transfer mode, select one of the packets received from said second current-use packet transmission path and said second spare packet transmission path, wherein said each of said plurality of nodes further comprises:

a fault detecting section configured to detect a fault between a neighbor node and said each of said plurality of nodes;

a broadcast fault notifying section configured to generate fault notice data for broadcast in response to a fault detection notice from said fault detecting section, wherein the fault notice data contains data indicating that the fault has been detected; and a path control data extracting section configured to transfer the fault notice data to said path controller, wherein said packet transferring section externally transfers said fault notice data to one or more other nodes, and wherein said path controller instructs said transfer mode switching section to switch the transfer mode of said each of said plurality of nodes to said 1+1 transfer mode in response to the fault notice data in a case that said each of said plurality of nodes is selected as one of said second pair of termination nodes, even when no fault is detected in said second current-use packet transmission path.

5. The fault recovery method according to claim 4, further comprising:

broadcasting fault notice data to said plurality of nodes when the fault is detected in said packet transmission network, wherein, in said broadcasting, a node of said plurality nodes which receives the fault notice data transfers the fault notice data to a neighbor node of said plurality nodes, and wherein operations of said first and second pair of termination nodes are switched to said 1+1 transfer mode in response to said fault notice data.

6. The fault recovery method according to claim 4, further comprising:

when said packet transmission between said second pair of termination nodes is performed in said 1+1 transfer mode, selecting a selected packet transmission path from said second current-use packet transmission path and said second spare packet transmission path by each of said second pair of termination nodes; and transferring a reception packet received through said selected packet transmission path to a next destination node.

7. A computer-readable non-transitory storage medium in which a program code is stored to realize a fault recovery method in a packet transmission network which comprises a plurality of nodes and is adapted to a packet transmission using a first current-use packet transmission path and at least one first spare packet transmission path which are defined between a first pair of termination nodes selected from said plurality of nodes and a packet transmission using a second current-use packet transmission path and at least one second spare packet transmission path which are defined between a second pair of termination nodes selected from said plurality of nodes, said fault recovery method comprising:

transferring packets between said first pair of termination nodes and between said second pair of termination nodes in a 1:1 transfer mode when no fault occurs, wherein, in said 1:1 transfer mode, said first and second pairs of termination nodes transfer packets via said first and second current-use packet transmission paths without using said first and second spare packet transmission paths;

detecting a fault in said first current-use packet transmission path;

when the fault is detected in said first current-use packet transmission path, switching both of said packet transmissions between said first pair of termination nodes and between said second pair of termination nodes from said 1:1 transfer mode to a 1+1 transfer mode, wherein, in said 1+1 transfer mode, said first pair of termination nodes operate to transfer packets by using both of said first current-use packet transmission path and said first spare packet transmission path and said second pair of termination nodes operate to transfer packets by using both of said second current-use packet transmission path and said second spare packet transmission path, wherein each of said plurality of nodes comprises:

a transfer mode switching section configured to switch a transfer mode of said each of said plurality of nodes between said 1:1 transfer mode and said 1+1 transfer mode;

a path controller configured to instruct said transfer mode switching section to switch the transfer mode;

a packet transferring section configured to transfer packets in said 1:1 transfer mode when the fault does not occur in said packet transmission network; and a reception path selecting section configured to, when said each of said plurality of nodes is selected as any of said second pair of termination nodes and the packet transmission between said second pair of termination nodes is performed in said 1+1 transfer mode, select one of the packets received from said second current-use packet transmission path and said second spare packet transmission path, wherein said each of said plurality of nodes further comprises:

a fault detecting section configured to detect a fault between a neighbor node and said each of said plurality of nodes;

a broadcast fault notifying section configured to generate fault notice data for broadcast in response to a fault detection notice from said fault detecting section, wherein the fault notice data contains data indicating that the fault has been detected; and a path control data extracting section configured to transfer the fault notice data to said path controller, wherein said packet transferring section externally transfers said fault notice data to one or more other nodes, and wherein said path controller instructs said transfer mode switching section to switch the transfer mode of said each of said plurality of nodes to said 1+1 transfer mode in response to the fault notice data in a case that said each of said plurality of nodes is selected as one of said second pair of termination nodes, even when no fault is detected in said second current-use packet transmission path.

8. The computer-readable non-transitory storage medium according to claim 7, wherein said fault recovery method further comprises:

broadcasting fault notice data to said plurality of nodes when the fault is detected in said first current-use packet transmission path, wherein, in said broadcasting, a node of said plurality nodes which receives the fault notice data transfers the fault notice data to a neighbor node of said plurality nodes, and wherein operations of said first and second pair of termination nodes are switched to said 1+1 transfer mode in response to said fault notice data.

9. The computer-readable non-transitory storage medium according to claim 7, wherein said fault recovery method further comprises:

when said packet transmission between said second pair of termination nodes is performed in said 1+1 transfer mode, selecting a selected packet transmission path from said second current-use packet transmission path and said second spare packet transmission path by each of said second pair of termination nodes; and transferring a reception packet received through said selected packet transmission path to a next destination node.

10. The packet transmission system according to claim 1, wherein, when said each of said plurality of nodes is selected as one of said second pair of termination nodes, said path controller of said each of said plurality of nodes:
  receives a packet containing packet transmission path selection data which contains a packet reception condition of said second current-use packet transmission path and a packet reception condition of said second spare packet transmission path, from the other of said second pair of termination nodes, when the transfer mode is switched from said 1+1 transfer mode to the 1:1 transfer mode,
  compares the packet reception condition of said second current-use packet transmission path and the packet reception condition of said second spare packet transmission path, and
  determines a packet transmission path used in said 1:1 transfer mode based on the comparing result.

11. A packet transmission system comprising a packet transmission network which includes a plurality of nodes,
  wherein two of said plurality of nodes are adapted to be selected as a first pair of termination nodes between which a first current-use packet transmission path and at least one first spare packet transmission path are defined, and other two of said plurality of nodes are adapted to be selected as a second pair of termination nodes between which a second current-use packet transmission path and at least one second spare packet transmission path are defined,
  wherein said plurality of nodes are configured to detect a fault in said packet transmission network,
  wherein, when no fault occurs, packets are transmitted between said first pair of termination nodes and between said second pair of termination nodes in a 1:1 transfer mode when no fault occurs, wherein, in said 1:1 transfer mode, said first and second pairs of termination nodes transfer packets via said first and second current-use packet transmission paths, respectively, without using said first and second spare packet transmission paths;
  when said fault is detected in said first current-use packet transmission path, both of said packet transmissions between said first pair of termination nodes and between said second pair of termination nodes are switched from said 1:1 transfer mode to a 1+1 transfer mode, wherein, in said 1+1 transfer mode, said first pair of termination nodes operate to transfer packets by using both of said first current-use packet transmission path and said first spare packet transmission path and said second pair of termination nodes operate to transfer packets by using both of said second current-use packet transmission path and said second spare packet transmission path,
  wherein each of said plurality of nodes comprises:
  a transfer mode switching section configured to switch a transfer mode of said each of said plurality of nodes between said 1:1 transfer mode and said 1+1 transfer mode;
  a path controller configured to instruct said transfer mode switching section to switch the transfer mode;
  a packet transferring section configured to transfer packets in said 1:1 transfer mode when the fault does not occur in said packet transmission network; and
  a reception path selecting section configured to, when said each of said plurality of nodes is selected as any of said second pair of termination nodes and the packet transmission between said second pair of termination nodes is performed in said 1+1 transfer mode, select one of the packets received from said second current-use packet transmission path and said second spare packet transmission path,
  wherein, when said each of said plurality of nodes is selected as one of said second pair of termination nodes, said path controller of said each of said plurality of nodes selects said second current-use packet transmission path if it is possible to select said second current-use packet transmission path, when the transfer mode is switched from said 1+1 transfer mode to said 1:1 transfer mode.

12. The fault recovery method according to claim 4, further comprising:
  transmitting 1+1 transfer mode cancelling packets by one of said second pair of termination nodes which transfers packets in said 1+1 transfer mode using both of said second current-use packet transmission path and said second spare packet transmission path; and
  switching the transfer mode of the packet transmission between said second pair of termination nodes from said 1+1 transfer mode to said 1:1 transfer mode, by said one of said second pair of termination nodes.

13. The fault recovery method according to claim 5, wherein said transferring of said fault notice data comprises:
  when the node receiving said fault notice data already has received said fault notice data, said fault notice data is not transferred to a neighbor node.

14. The fault recovery method according to claim 6, wherein said selecting said selected packet transmission path comprises:
  selecting one of said second current-use packet transmission path and said second spare packet transmission path which transfers a corresponding one of said 1+1 transfer mode switching packets earliest as said selected packet transmission path.

15. The fault recovery method according to claim 6, wherein said selecting said selected packet transmission path comprises:
  selecting one, which has the highest quality in quality monitoring, of said second current-use packet transmission path and said spare packet transmission path as said selected packet transmission path.

16. The computer-readable non-transitory storage medium according to claim 7, wherein said fault recovery method further comprises:
  transmitting 1+1 transfer mode cancelling packets by one of said second pair of termination nodes which transfers packets in said 1+1 transfer mode using both of said second current-use packet transmission path and said second spare packet transmission path; and
  switching the transfer mode of the packet transmission between said second pair of termination nodes from said 1+1 transfer mode to said 1:1 transfer mode, by said one of said second pair of termination nodes.

17. The computer-readable non-transitory storage medium according to claim 8, wherein said transferring of said fault notice data comprises:
  when the node receiving said fault notice data already has received said fault notice data, said fault notice data is not transferred to a neighbor node.

18. The computer-readable non-transitory storage medium according to claim 9, wherein said selecting said selected packet transmission path comprises:
  selecting one of said second current-use packet transmission path and said second spare packet transmission path which transfers a corresponding one of said 1+1 transfer mode switching packets earliest as said selected packet transmission path.

19. The computer-readable non-transitory storage medium according to claim 9, wherein said selecting said selected packet transmission path comprises:

selecting one, which has the highest quality in quality monitoring, of said second current-use packet transmission path and said spare packet transmission path as said selected packet transmission path.

\* \* \* \* \*